Friend & Seiler,

Finger Ring,

No. 668. Reissued Feb. 22, 1859.

Witnesses:
Lemuel W. Serrell
Thomas G. Harold

Inventor:
Samuel Friend
George Lisler

UNITED STATES PATENT OFFICE.

SAMUEL FRIEND AND GEORGE SEILER, OF NEW YORK, N. Y.

EXTENSION FINGER-RING.

Specification forming part of Letters Patent No. 22,358, dated December 21, 1858; Reissue No. 668, dated February 22, 1859.

*To all whom it may concern:*

Be it known that we, SAMUEL FRIEND and GEORGE SEILER, of the city and State of New York, have invented, made, and applied to use a certain new and useful Improvement in Finger-Rings, which we denominate the "Extension Finger-Ring;" and we do hereby declare that the following is a full, clear, and exact description of the construction and operation of the same, reference being had to the annexed drawings, making part of this specification, wherein—

Figure 2:
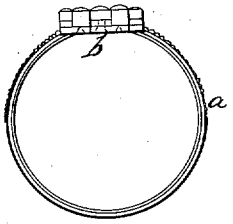
Figure 1:
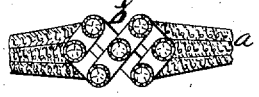
Figure 3:
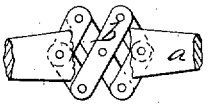

Figure 1 is a side view of the ring with our improvements. Fig. 2 is an edge view thereof, and Fig. 3 is a section showing the inner part of said ring.

Similar marks of reference denote the same parts.

In the construction of finger-rings great difficulty has heretofore existed in obtaining the necessary variety of sizes, because if a ring is loose, the fingers being generally smaller than the knuckles involves risk of loss, and if the least tight great difficulty arises in getting the same on or off the fingers.

The nature of our said invention consists in the use of a divided ring so fitted as to spring apart when passing the joints of the finger or being withdrawn from said finger, the ends of such divided springing ring being connected by such ornamental devices that the springing of the ring is allowed for, and the appearance of the ring is not injured.

In the drawings, *a* is the spring-ring, shown in large size for the purpose of illustration. This may be of any desired size or character, and either ornamental or plain. The ends of this spring are attached to each other, and at the same time permitted to spring apart, by means of the cross-bars *b b*, jointed to each other so that they will fold together when either distended or shut up.

We have shown the bars as ornamented with settings of stones; but the bars themselves may be ornamental, or fitted to carry a plate with any desired stone, seal, or other ornament, said plate being attached to the center rivet of said jointed bars, or in any other convenient manner, so long as the devices for connecting the ends of the divided ring do not interfere with springing the divided ring apart or the closing thereof onto the finger.

Having thus described our said invention, we would remark that the advantages of the same will be apparent, for by this simple arrangement a ring is adapted to fingers of different sizes, and by springing in passing the knuckle will hold firmly to the finger. Thus one divided springing ring is adapted under circumstances where three or four different sizes of the ordinary rings would be required, besides possessing the advantage of holding more firmly onto the finger, and by being of a yielding nature will not be so liable to injury as the ordinary ring.

What we claim as our invention, and desire to secure by Letters Patent, is—

A divided springing finger-ring constructed substantially in the manner and for the purposes specified, whereby the springing of the ring permits the same to pass the joints, as set forth.

In witness whereof we have hereunto set our signatures this 3d day of February, 1859.

SAMUEL FRIEND.
GEORGE SEILER.

Witnesses:
LEMUEL W. SERRELL,
THOMAS G. HAROLD.